United States Patent [19]

Weller et al.

[11] Patent Number: 4,772,777
[45] Date of Patent: Sep. 20, 1988

[54] TEMPERATURE REGULATED HOT PLATE FOR AN ELECTRIC COFFEE MAKER

[75] Inventors: Albrecht Weller, Steinbach; Peter Moravek, Bad Soden; Karl Amsel, Oberursel; Bernd Trebitz, Königstein; Jürgen Schmidt, Bernsheim/Auerbach; Ernst Heimrath, Bad Soden, all of Fed. Rep. of Germany

[73] Assignee: Braun Aktiengesellschaft, Kronberg, Fed. Rep. of Germany

[21] Appl. No.: 915,153

[22] Filed: Oct. 2, 1986

[30] Foreign Application Priority Data

Oct. 5, 1985 [DE] Fed. Rep. of Germany ....... 3535687

[51] Int. Cl.⁴ .......................... H05B 3/68; F24H 1/10; A47J 31/00
[52] U.S. Cl. ..................... 219/283; 99/281; 99/288; 99/304; 99/307; 126/374; 165/32; 165/96; 219/301; 219/433; 219/434; 219/462; 219/530; 219/540
[58] Field of Search ......... 219/283, 443–468, 219/530, 540, 378, 415–419, 297–301, 429–435; 99/288, 279–282, 304–306, 307; 165/96 R, 96 HV, 32.HV; 126/374

[56] References Cited

U.S. PATENT DOCUMENTS

| 1,102,392 | 7/1914 | Denhard | 219/456 |
| 1,649,506 | 11/1927 | Brewer | 219/530 X |
| 2,025,252 | 12/1935 | Stencell | 219/454 |
| 2,782,782 | 2/1957 | Taylor | 165/32 HV |
| 2,810,058 | 10/1957 | Fernicola | 219/465 |
| 2,896,609 | 7/1959 | Jacobsson | 126/374 |
| 2,898,905 | 8/1959 | Thomas | 126/374 |
| 3,578,951 | 5/1971 | Ingrao | 219/444 |
| 4,206,341 | 6/1980 | Leuschner et al. | 219/434 X |
| 4,430,553 | 2/1984 | Antimovski | 165/96 HV |

FOREIGN PATENT DOCUMENTS

| 2503844 | 1/1978 | Fed. Rep. of Germany . |
| 2233568 | 1/1975 | France | 219/460 |

Primary Examiner—Anthony Bartis

[57] ABSTRACT

A fixedly positioned hot plate, particularly for use with a coffee maker, has an upper surface for receiving a container of liquid to be maintained at a constant temperature. An electric heating device arranged underneath the hot plate includes a plate member movable between a first position in biased engagement with the underside of the hot plate and a second position spaced therefrom to vary the heat exchange rate therebetween. Secured to the underside of the plate member is a metallic sheathed heating having a water heating pipe soldered to the periphery thereof. A temperature sensitive element, e.g. U-shaped bimetal, thermally coupled to the heating device has a first portion connected to a downwardly dependent stud secured to the underside of the hot plate and extending freely through a bore in the plate member an a second portion secured to the plate member. The temperature sensitive element is arranged to move the plate member toward and away from the hot plate in response to the temperature of the heating device to maintain the temperature of the liquid in the container at constant optimal value independent of the amount of liquid in the container.

15 Claims, 3 Drawing Sheets

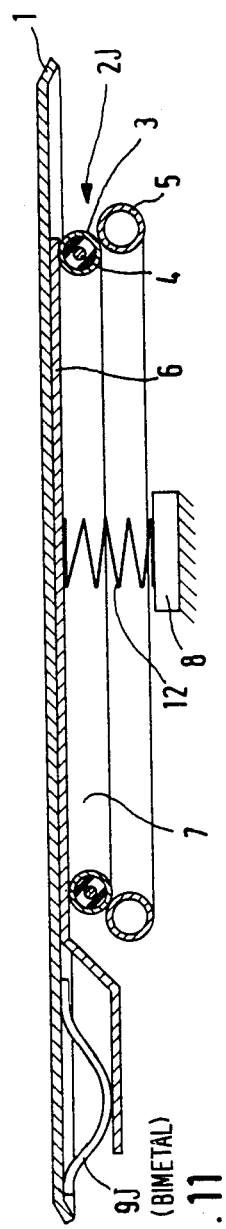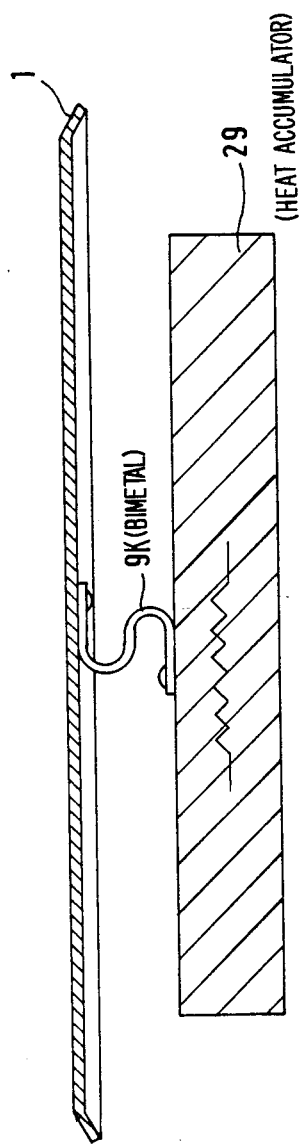

TEMPERATURE REGULATED HOT PLATE FOR AN ELECTRIC COFFEE MAKER

This invention relates to a hot plate, particularly for an electric coffee maker, including an electric heating device arranged underneath the hot plate, wherein the heat coupling of the heating device to the hot plate is variable by adjusting the distance between the heating device and the hot plate.

A hot plate of the aforementioned type is already known from German Patent Specification No. DE-C3-2,503,844. For regulating the temperature of the hot plate or the liquid held in a container deposited on the hot plate, a mechanical adjusting device arranged on the side of the hot plate housing is used by means of which the distance between the heating element and the hot plate can be adjusted. With this known hot plate, however, it is not possible to regulate the temperature of the liquid accurately. This would only be possible if the actual temperature of the liquid in the container was established by an operator and corrected manually by means of the adjusting device to reflect the desired temperature. To maintain a constant temperature, this adjustment operation would have to be repeated many times, particularly if the liquid level in the container kept changing which, as a rule, occurs frequently.

Regulating the temperature becomes even more difficult if an insulated jug is used in lieu of a glass bowl; because of the low heat losses of the insulated jug, it may easily happen that with the heating element in abutment with the hot plate the liquid comes to a boil quickly with the supply of little heat, which is undesirable particularly with coffee or tea since repeated boiling impairs the aroma and taste of these beverages. On the other hand, it is highly inconvenient for an operator to constantly check the temperature of the beverage and vary it, as necessary, by means of the adjusting device.

It is, therefore, an object of this invention to provide a hot plate in which the temperature is regulated automatically by simple and economical means and in which the liquid temperature is at all times maintained constant at an optimum value, independent of the amount of liquid held in the container.

According to the invention, this object is accomplished in that the distance between the heating device and the hot plate is adjustable by a temperature-sensitive element. The above disadvantages are obviated by this invention. The temperature-sensitive element regulates the temperature of the liquid automatically, independent of the amount of liquid held in the container, by varying the distance between the heating element and the hot plate if the actual temperature does not correspond to the predetermined temperature. Accordingly, the beverage will at all times reflect the optimum drinking temperature. In selecting a temperature-sensitive element, practically any temperature-sensitive element known from the prior art may be used.

In accordance with the invention, a temperature-sensitive element which has proved to be particularly economical and technically dependable is connected via at least one first contact to a stop means formed fast with the housing and is connected via at least a second contact to the heating device. In coffee makers, a less complex arrangement can be accomplished by providing for the heating element to be displaceable relative to the hot plate. However, it is also generally conceivable to provide for displacement of the hot plate relative to the heating element.

To ensure a particularly good heat transference from the heating device to the hot plate while the hot plate is still relatively cold, that is, with the heating element still resting against the hot plate, the present invention provides for the heating device to be biased into abutment with the hot plate in the lower temperature range. As the temperature subsequently increases, the heating device will be moved away from the hot plate by the temperature-sensitive element.

In accordance with the invention, the biasing force, which decreases as the temperature of the temperature-sensitive element increases, is produced by the temperature-sensitive element itself. Thus, the temperature-sensitive element regulates, in dependence upon the temperature, both the distance between the heating element and the hot plate and at the same time the contact pressure transmitted from the heating element to the hot plate. Accordingly, the temperature-sensitive element acts at the same time as a spring. This eliminates the need for additional spring elements, resulting in a low-cost temperature-regulating device.

To ensure that the heating device is reliably moved towards and away from the hot plate by the temperature-sensitive element, the invention provides for the first and second contacts of the temperature-sensitive element to be in positive engagement with the hot plate and, respectively, the heating device. The deflection of the temperature-sensitive element which is caused by temperature variation will only affect the second contact in the form of a variation of travel, since the second contact is free to move with the heating device while the first contact is in positive engagement with the hot plate which is fixedly mounted on the housing of a domestic appliance such as a coffee maker, for example.

According to the invention, the temperature-sensitive element can be manufactured particularly simply by providing it with a substantially U-shaped configuration and by the contacts being formed by the free ends of the temperature-sensitive element. When the temperature increases, the temperature-sensitive element will be deflected to a degree sufficient to cause the second contact to approach the first contact, as a result of which the heating element connected to the second contact will be lifted clear of the hot plate.

For the temperature-sensitive element to be sufficiently heated by the heating device within a suitably short period of time, an improvement of the invention provides for the temperature-sensitive element to have, in addition to the first and second contacts, at least a third contact abutting the heating device. By virtue of this arrangement, the temperature-sensitive element is heated not only by the heat radiation emitted by the heating element which is frequently not sufficient for a sufficiently large deflection of the temperature-sensitive element, but is heated additionally as a result of the transference of heat on the third contact.

In a U-shaped heating element having a plate secured to its upper side extending substantially parallel to the hot plate, the temperature-sensitive element may be secured particularly simply by arranging a stud on the underside of the hot plate opposite the heating element, by having the stud extend through the plate and through the two free ends of the temperature-sensitive element via bores provided on these parts, and by fixedly connecting the first contact to the plate and the second contact to the stud. By means of this arrangement, the temperature-sensitive element is not provided between the hot plate and the heating device but underneath the heating device where sufficient space is available for mounting the temperature-sensitive element.

For the purpose of securing the temperature-sensitive element and adjusting the biasing force, an adjusting device is advantageously provided at the connection between the stud and the temperature-sensitive element. This adjusting device permits an accurate adjustment of the biasing force so that variations in the biasing forces as they occur in the assembly as a result of unavoidable manufacturing tolerances are avoided. However, the adjusting device also permits the temperature-sensitive element to be biased to different settings, resulting in different ranges of temperature on the hot plate.

The temperature-sensitive element may be attached to, and detached from, the heating element particularly simply by providing for positive engagement of the first contact with the plate through a bayonet catch. It is to be understood that other types of fastening are also possible.

To be able to use the heating element not only for keeping the hot plate hot but at the same time also for boiling the water required for the preparation of beverages, there is provided by the invention a water pipe which extends on the outer periphery parallel to the heating element, is soldered to the heating element along the major part of its area and is spaced a small distance from the plate.

According to an improvement of the invention, in the assembled condition of the temperature-sensitive element on the hot plate, the temperature-sensitive element has its leg, close to the heating coil, in biased abutment with the water pipe for the purpose of obtaining a particularly effective heat transference from the heating element to the temperature-sensitive element.

The invention can be implemented particularly simply and economically if the temperature-sensitive element is a bimetallic member.

A particularly constant temperature regulation of the hot plate at a low turn-on frequency can be accomplished if the electric heating device forms at the same time a heat accumulator. The temperature-sensitive element can be heated either by the temperature of the hot plate, or by the temperature of the heat accumulator, or by the temperature of the free space formed between the heat accumulator and the hot plate, or by all elements simultaneously.

The temperature-sensitive element may also be made of a memory metal. Such memory metals are available in the trade at low cost and particularly suitable for use as expansion elements.

The invention affords another possibility of regulating the temperature of a hot plate having a heat accumulator with a heating device arranged underneath by providing for the heat coupling of the heating device/heat accumulator to the hot plate to be adjustable by a material formed between the heating device/heat accumulator and the hot plate, the material having a temperature-dependent coefficient of thermal conduction. In steel with a carbon content of 0.10%, for example, the specific thermal conductivity decreases as the temperature increases, that is, the temperature of the hot plate can be regulated within certain limits also by this means.

Several embodiments of the invention will now be described in more detail by way of example, with reference to the accompanying drawings, in which:

FIG. 11 is a longitudinal section schematic view similar to FIG. 1 illustrating an eleventh embodiment of the invention; and FIG. 12 is a schematic longitudinal sectional view illustrating a hot plate with a heat accumulator arranged underneath the hot plate and connected to the hot plate through a temperature-sensitive element.

To avoid repetitions and an unnecessarily large number of reference numerals, parts identical in construction have been assigned like reference numerals throughout the FIGS. 1 to 12.

Figure 1:
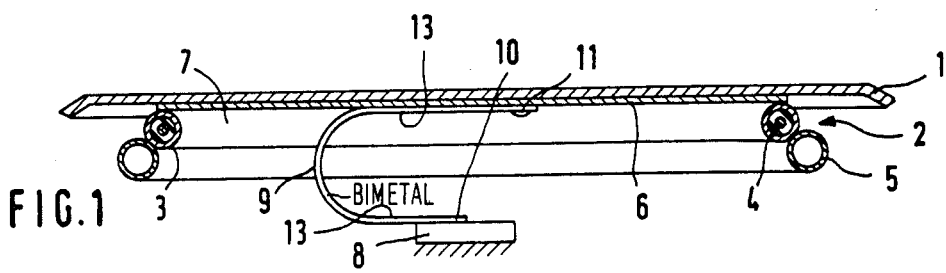
FIG. 1 is a schematic view illustrating an embodiment of the invention in longitudinal section.

Referring now to FIGS. 1 to 11, there extends below the discoid hot plate 1 a heating device 2 which is formed by a U-shaped metal tube 3, a plate 6 and a water pipe 5. Arranged concentrically in the metal tube 3 is a heating wire 4. The annular clearance space between the metal tube 3 and the heating wire 4 is filled with insulating material. The ends of the heating wire 4, not shown, which project out of the radially outwardly extending free legs of the U-shaped metal tube 3 are adapted to be connected to a source of electrical energy, not shown in the drawing either. The supply of current to the heating wire 4 is controllable by an electric thermal circuit breaker, not shown in the drawing, which controls the temperature of the heating device 2.

Resting against the radially outer wall of the metal tube 3 is the water pipe 5 which extends parallel to the heating device 2 and is likewise of U-shaped configuration. For improved heat transference, the surface of the water pipe 5 close to the metal tube 3 is soldered to the heating element 2. Soldered to the upper side of the metal tube 3 is a plate 6 having good heat conducting properties and covering from above the circular area 7 formed by the metal tube 3. With the heating device 2 cold, the plate 6 will be in abutment with the underside of the hot plate 1. In the embodiments shown, the water pipe 5 has a cross-sectional area greater than that of the metal tube 3 and is arranged relative to the metal tube 3 such that its topmost boundary area extends below the plate 6 and, as the metal tube 3, parallel thereto.

The radially outer boundary area of the hot plate is in positive and fixed engagement with a housing not shown in the drawing, for example, the housing of a coffee maker. The upper side of the hot plate 1 serves as a deposit for containers including, for example, glass bowls or Thermos bottles the contents of which, such as beverages or other food, can be heated or kept hot by the hot plate 1.

Below the hot plate 1 is a stop means 8 formed fast with the housing and supporting the plate 6 from below, when viewing the drawing, by means of a spring element 9. In the normal position shown, the spring element 9 biases the plate 6 into abutment with the underside of hot plate 1. In FIGS. 1 to 6 and in FIG. 10, the spring element 9 is formed by a bimetallic member which abuts the stop means 8 formed fast with the housing through the first contact 10 and is secured to the underside of the plate 6 or the water pipe 5 or the heating device 2 through the second contact 11.

Figure 10:
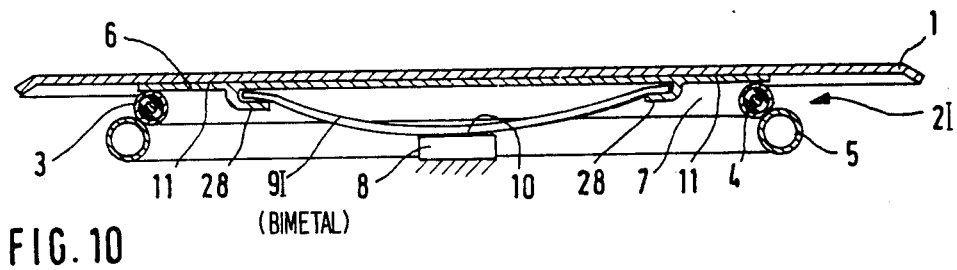
FIG. 10 is a longitudinal section schematic view similar to FIG. 1 illustrating a tenth embodiment of the invention.

With the bimetallic member 9 not mounted on the hot plate 1, the shortest distance between the two contacts 10, 11 is greater than illustrated in FIGS. 1 to 6 and in FIG. 10. It is only in the assembly of these parts that the first contact 10 is pressed upwardly, when viewing the drawing, until it is in abutment with the upper side of the stop means 8 formed fast with the housing, the biasing force thus produced in the bimetallic member 9 urging the plate 6 against the underside of the hot plate 1 formed fast with the housing.

Figure 7:
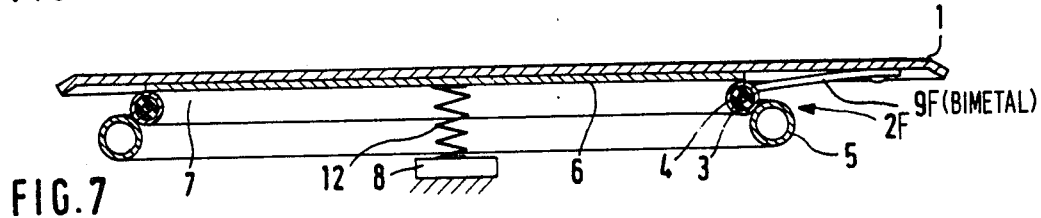
FIG. 7 is a longitudinal section schematic view similar to FIG. 1 illustrating a seventh embodiment of the invention.
Figure 8:
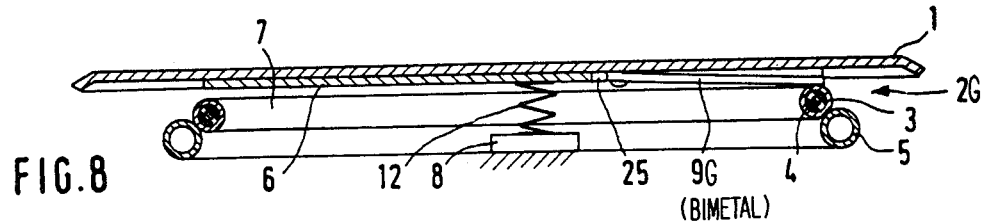
FIG. 8 is a longitudinal section schematic view similar to FIG. 1 illustrating an eighth embodiment of the invention.
Figure 9:
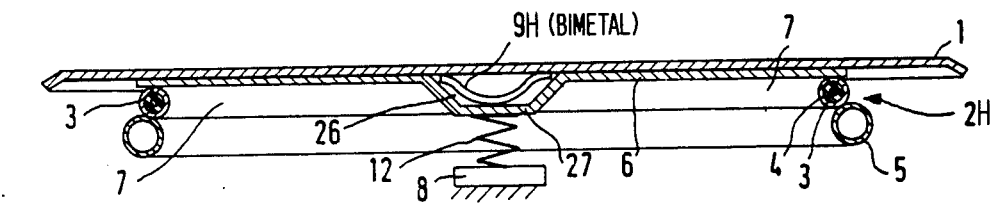
FIG. 9 is a longitudinal section schematic view similar to FIG. 1 illustrating a ninth embodiment of the invention.

In FIGS. 7 to 9 and in FIG. 11, the biasing force is produced by an additional spring 12 bearing with one end against the stop means 8 formed fast with the housing and with its other end against the underside of the plate 6, thereby urging the latter against the underside of the hot plate 1. In these embodiments, on a temperature variation the bimetallic member 9 operates only to adjust the distance between the heating device 2 and the hot plate 1, while the spring 12 produces the contact pressure.

In FIG. 1, the bimetallic member 9 is essentially of U-shaped configuration, extending only within the circular area 7 bounded by the heating element 2 and the water pipe 5. The straight legs 13 of the bimetallic member 9 extend substantially parallel to the plate 6.

Figure 2:
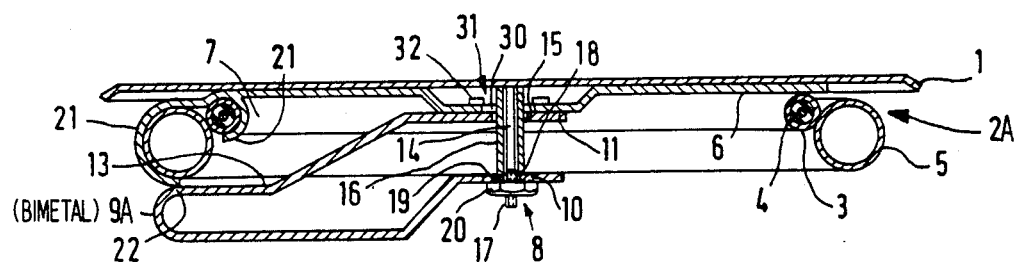
FIG. 2 is a longitudinal section schematic view similar to FIG. 1 illustrating a second embodiment of the invention.

In FIG. 2, the stop means 8 formed fast with the housing is provided by a sleeve 16 slipped on a stud 14. The stud 14 is secured to the underside of the hot plate 1, for example, by welding, extending vertically to the hot plate 1 downwards when viewing the drawing, both through the bore 30 formed in the plate 6 and through the bores 15 and 19 punched out at the free ends of the bimetallic member 9A.

The stud 14 is secured approximately in the center of the hot plate 1. The sleeve 16 bears with its upper end, when viewing the drawing, against the hot plate 1 and extends through the bores 30 and 15.

The free end of the stud 14 projects downwardly out of the sleeve 16 and is provided with a thread 17. The annular surface 18 formed at the lower end of the sleeve 16 serves as abutment stop for the first contact 10 of the bimetallic member 9A. For this purpose, the diameter of the bore 19 is slightly smaller than the outside diameter of the sleeve 16. The upper leg 13 of the bimetallic member 9A, when viewing the drawing, is in positive engagement with the plate 6 through a bayonet catch 31 provided on the edges of the bores 15, 30. On turning the bimetallic member 9A, diametrically opposite sheet metal tabs 32 provided on the bimetallic member 9A will engage the plate 6 from behind, thereby providing for positive engagement of the bimetallic member 9 with the heating device 2A.

In FIG. 2, a nut 20 is screwed to the thread 17 from below to tension the lower leg 12 of the bimetallic member 9A against the end 18 of the sleeve 16. The length of the sleeve 16 is dimensioned such that the bimetallic member 9A is sufficiently biased at room temperature. Instead of the sleeve 16, it is also possible to provide the stud 14 with a stop means in the form of a second nut arranged level with the end 18. This permits a particularly effective adjustment of the biasing force of the bimetallic member 9A.

In FIG. 2, the bimetallic member 9A is of substantially U-shaped configuration, extending radially outwardly until its upper leg 13, when viewing the drawing, abuts the underside of the water pipe 5. On the outer periphery of the plate 6, lugs 21 are formed abutting the radially outer edge of the heating device 2A and the water pipe 5. The lugs 21 locate the metal tube 3 relative to the water pipe 5 before these parts are soldered together.

The arrangement for securing the bimetallic member 9A to the heating device 2A and the heating device 2A to the hot plate 1 as shown in FIG. 2 may also be applied to all other embodiments of FIG. 1 and FIGS. 3 to 12.

Figure 3:
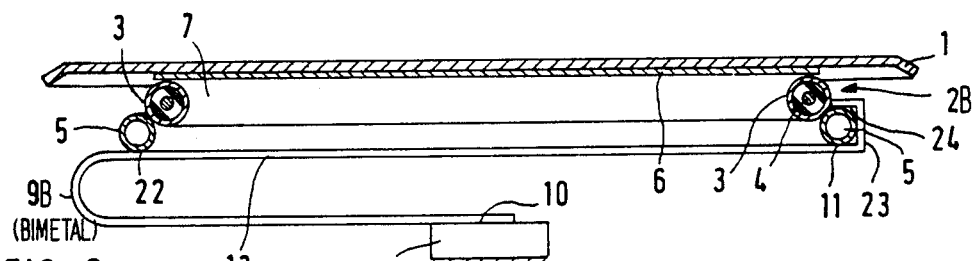
FIG. 3 is a longitudinal section schematic view similar to FIG. 1 illustrating a third embodiment of the invention.

The bimetallic member 9B shown in FIG. 3 is likewise of U-shaped configuration, resting with its first contact 10 against the stop means 8 formed fast with the housing, while its second contant 11 is in abutment with the underside of the water pipe 5. As already explained in the description with reference to FIG. 2, the upper leg 13 has also its third contact 22 in abutment with the underside of the water pipe 5. Because the bimetallic member 9B abuts the water pipe 5 via two contacts 11, 22, heating of the bimetallic member 9B can be improved. Radially outside the second contact 11, the bimetallic member 9B has a first section 23 extending upwards, when viewing the drawing. Slightly above the water pipe 5, the first section 23 continues in a second section 24 extending radially inwardly and ending short of the metal tube 3. Accordingly, the sections 23, 24 and the area of the second contact 11 embrace the water pipe 5 in such a manner that a displacement initiated by the bimetallic member 9B vertical to the hot plate 1 is necessarily conveyed to the heating device 2B.

Figure 4:
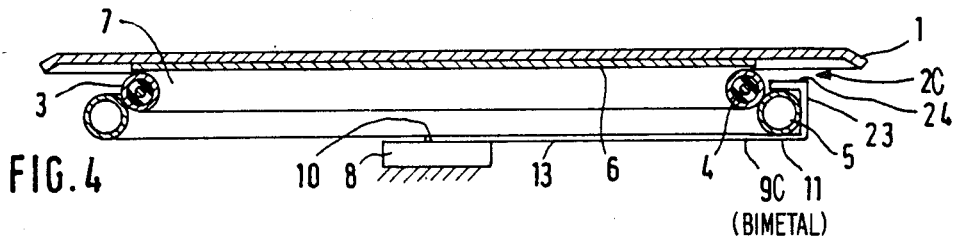
FIG. 4 is a longitudinal section schematic view similar to FIG. 1 illustrating a fourth embodiment of the invention.

In FIG. 4, the bimetallic member 9C is comprised of a single leg 13 only, extending from the stop means 8 formed fast with the housing radially outwardly up to the water pipe 5. In accordance with FIG. 3, the radially outer end has likewise first and second sections 23, 24, thereby providing for positive engagement of this end with the water pipe 5. In this embodiment, a temperature variation will cause the bimetallic member 9C to deflect to a lesser extent than in the embodiments of FIGS. 2 and 3 while using identical materials, because the deflectable length of the bimetallic member is shorter.

Figure 5:
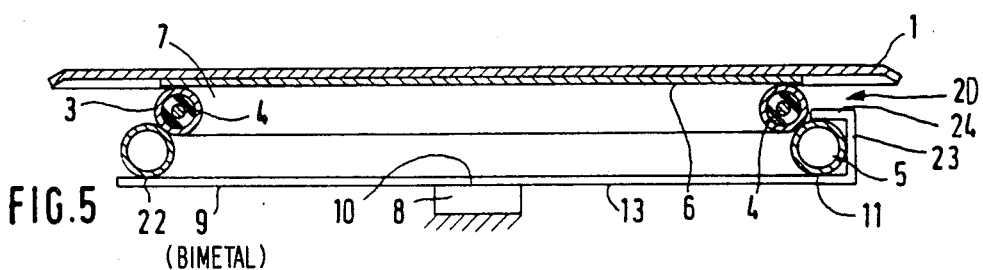
FIG. 5 is a longitudinal section schematic view similar to FIG. 1 illustrating a fifth embodiment of the invention.

The embodiment of FIG. 5 corresponds substantially to the embodiment of FIG. 4. It differs only in that in FIG. 5 the leg 13 has a leftward extension, when viewing the drawing, beyond the stop means 8 formed fast with the housing, and that this extension has an additional third contact 22 resting against the lower side of the water pipe 5. The extended configuration of the leg 13 permits the spring rate as well as the deflection of the bimetallic member 9D to be increased in the event of a temperature variation.

Figure 6:
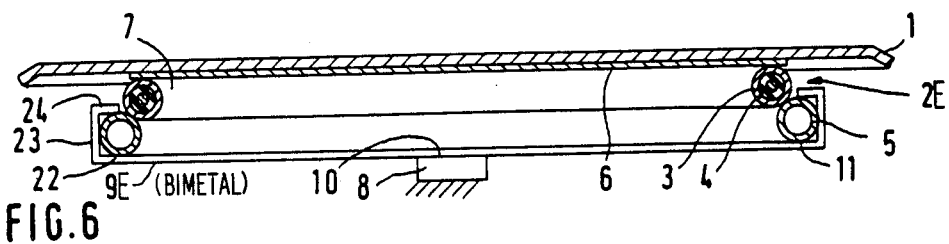
FIG. 6 is a longitudinal section schematic view similar to FIG. 1 illustrating a sixth embodiment of the invention.

The embodiment of FIG. 6 differs from the embodiment of FIG. 5 only in that the third contact 22 is continued in the sections 23 and 24 according to FIG. 4, so that the water pipe 5 is firmly clamped at two opposite ends. If a temperature variation occurs, this will cause the heating device 2E to be lifted clear of the hot plate 1 parallel thereto.

In FIG. 7, the bimetallic member 9F extends radially outside the heating device 2F, having its radially outer end in positive engagement with the underside of the hot plate 1. The radially inner end rests with its freely movable end portion against the upper side of the heating device 2F. In the event of an increase in temperature, the free end of the bimetallic member 9F will be moved downwards away from the hot plate 1, thereby unseating the heating device 2F from the hot plate in opposition to the force of the spring 12.

The embodiment of FIG. 8 differs from the embodiment of FIG. 7 only in that the bimetallic member 9G is secured to the hot plate 1 radially within the boundaries of the heating device 2G, extending radially outwardly up to the heating element 2 where it rests with its free end against the upper side of the metal tube 3. To enable the plate 6 to be flush with the hot plate, a recess 25 is provided in the plate 6 in the area of the bimetallic member 9G.

In FIG. 9H, the bimetallic member 9 is arranged between the plate 6 and the hot plate 1. The bimetallic member 9H is dished downwardly, being received in a depression 26 formed in the plate 6. With its free ends, the bimetallic member 9H takes support upon the hot plate 1 while the area of its lowermost point bears upon the bottom 27 of the depression 26. In this embodiment, the bimetallic member 9H may sit loosely in the depression 26 since the bimetallic member 9H guided in the depression 26, having the hot plate 1 as its upper boundary.

In FIG. 10, the bimetallic member 9I is arranged below the plate 6 and is dished downwardly. Its free ends rest against the underside of the plate 6, being held in the plate 6 by sheet-metal tabs 28 provided on and projecting from the underside of the plate 6. In the area of its lowermost point, the bimetallic member 9I bears against the stop means 8 formed fast with the housing.

The embodiment of FIG. 11 corresponds substantially to the embodiment of FIG. 9J. It differs merely in that the downwardly dished bimetallic member 9 is formed radially outside the metal tube 3 and the water pipe 5 between the plate 6 and the hot plate 1. On an increase in the temperature of the bimetallic member 9J, the heating device 2J can unseat itself from the hot plate 1 on one side only.

In FIG. 12, a heat accumulator 29 with an integrated heating device (not shown) is arranged below the hot plate 1, its distance to the hot plate 1 being determined by a bimetallic member 9K formed between the hot plate 1 and the heat accumulator 29. The bimetallic member 9K is substantially of S-shaped configuration, having its upper and lower end in positive engagement with the hot plate 1 and the heat accumulator 29, respectively.

The thermal regulation of the hot plate 1 operates as follows:

At normal room temperature, the heating device 2 assume their normal positions shown in FIGS. 1 to 11, that is, they are urged into abutment with the underside of the hot plate 1 by the biasing force of the bimetallic member 9 or by the biasing force of the spring 12. Heating of the heating device 2 will also cause the bimetallic member 9 to be heated. In the embodiments in which the bimetallic member 9 is biased at the same time, an increase in temperature will first cause the biasing force to be reduced. In the process, no appreciable deflection of the bimetallic member 9 will initially occur, that is, the heating device 2 will continue being urged against the hot plate 1, enabling the latter to be heated within a minimum of time. In the embodiments providing the separate spring 12, the bimetallic member 9 will not deflect visibly either until it has achieved the biasing force of the spring 12.

However, as soon as the biasing force of the temperature-sensitive element 9 has been reduced or reached the biasing force of the spring 12, the bimetallic member 9 will deflect such as to cause unseating of the heating device 2 from the hot plate 1. Depending on the manner in which the bimetallic member 9 is mounted the plate 6 will be moved parallel to the hot plate 1 or it will be tipped downwards on one side away from the hot plate 1. This produces an air chamber between the plate 6 and the hot plate 1, reducing the heat transference from the heating device 2 to the hot plate 1. The larger the air chamber becomes, the less heat the hot plate 1 can develop. If the heating device 2 cools down because it is disconnected from the electrical supply by a thermal circuit breaker not shown in the drawing, the temperature of the bimetallic member 9 will also drop, causing the plate 6 to approach the hot plate 1 again. This provides a simple means of automatically regulating the temperature of the hot plate 1 and thus also the temperature of beverages or other food held in a container deposited on the hot plate 1, thereby eliminating the possibility of overheating.

We claim:

1. In an electrical appliance, particularly an electric coffee maker, a fixedly positioned hot plate structure having an upper surface for receiving an article to be heated, an electric heating device arranged underneath said hot plate structure in heat exchange relationship therewith.

stud structure secured to the underside of said hot plate structure and extending downwardly therefrom, said heating device including a plate member movable between a first position in engagement with the underside of said hot plate structure and a second position spaced from said hot plate structure to vary the heat exchange rate therebetween, said plate member having an aperture through which said stud structure freely extends, and a temperature-sensitive element thermally coupled to said heating device and adapted to deform as a function of its temperature, said temperature-sensitive element having first contact means connecting a first portion of said temperature-sensitive element to said stud structure, and second contact means connecting a second portion of said temperature-sensitive element to said plate member of said heating device, said second portion having a bore through which said stud structure freely extends, said temperature sensitive element being arranged to move said plate member toward and away from said hot plate structure.

2. The electrical appliance as claimed in claim 1 wherein said temperature-sensitive element is substantially of U-shaped configuration and has first and second free ends, and said first and second contact means are at said first and second free ends, respectively, of the temperature-sensitive element.

3. The electrical appliance as claimed in claim 2 wherein said temperature-sensitive element abuts said heating device at a third point intermediate said free ends.

4. The electrical appliance as claimed in claim 1 wherein said temperature-sensitive element is adapted to apply a biasing force to seat said plate member against the underside of said hot plate structure, and said first contact means includes adjusting means at the connection between said stud structure and said temperature-sensitive element for adjusting said biasing force.

5. An electric appliance as claimed in claim 4 wherein said second contact means includes bayonet catch structure that positively connects said temperature-sensitive element and said plate member.

6. An electric appliance as claimed in claim 1 wherein said heating device includes a heating element that is soldered to said plate member and a water pipe at the outer periphery of said heating element, said water pipe being soldered to said heating element and spaced a small distance from said plate member.

7. An electric appliance as claimed in claim 6 wherein said temperature-sensitive elements has a leg portion and said leg portion is in biased abutment with said water pipe.

8. An electric appliance as claimed in claim 1 wherein said temperature-sensitive element is a bimetallic member.

9. The electrical appliance as claimed in claim 8 wherein said temperature-sensitive element is substantially of U-shaped configuration and has first and second free ends and said first and second contact means are at said first and second free ends, respectively, of the temperature-sensitive element.

10. The electrical appliance as claimed in claim 9 wherein said temperature-sensitive element is adapted to apply a biasing force to seat said plate member against the underside of said hot plate structure, and said first contact means includes adjusting means at the connection between said stud structure and said temperature-sensitive elements for adjusting said biasing force.

11. An electric appliance as claimed in claim 10 wherein said second contact means includes bayonet catch structure that positively connects said temperature-sensitive element and said plate member.

12. An electric appliance as claimed in claim 11 wherein said heating device includes a heating element that is soldered to said plate member and a water pipe at the outer periphery of said heating element, said water pipe being soldered to said heating element and spaced a small distance from said plate member.

13. An electric appliance as claimed in claim 12 wherein said temperature-sensitive element has a leg portion and said leg portion is in biased abutment with said water pipe.

14. The electrical appliance as claimed in claim 13 wherein said temperature-sensitive element is adapted to apply a biasing force to seat said plate member against the underside of said hot plate structue, and said first contact means includes adjusting means at the connection between said stud structure and said temperature-sensitive element for adjusting said biasing force.

15. An electric appliance as claimed in claim 14 wherein said temperature-sensitive element is substantially of U-shaped configuration and has first and second free ends, said first and second contact means are at said first and second free ends, respectively, of said temperature-sensitive element, and said second contact means includes bayonet catch structure that positively connects said temperature-sensitive element and said plate member.

* * * * *

UNITED STATES PATENT AND TRADEMARK OFFICE
CERTIFICATE OF CORRECTION

PATENT NO. : 4,772,777
DATED : September 20, 1988
INVENTOR(S) : Albrecht Weller, et al.

It is certified that error appears in the above-identified patent and that said Letters Patent is hereby corrected as shown below:

Col. 6, line 33, "contant" should be --contact--.

Col. 7, line 25, "element 2" should be --device 2G--.

Col. 7, line 49, "9J" should be --9--;
    line 50, "9" should be --9J--.

Col. 9, claim 7, line 30, "elements" should be --element--.

Col. 10, claim 10, line 7, "said" should be deleted.

Col. 10, claim 12, line 14, "11" should be --8--.

Signed and Sealed this

Eighteenth Day of July, 1989

Attest:

DONALD J. QUIGG

Attesting Officer

Commissioner of Patents and Trademarks